United States Patent Office 2,843,636
Patented July 15, 1958

2,843,636
RACEMIZATION OF MENTHOL

Albert B. Booth, Jacksonville, Fla., assignor to The Glidden Company, Cleveland, Ohio, a corporation of Ohio No Drawing. Application June 15, 1955
Serial No. 515,764

4 Claims. (Cl. 260—631)

The present invention is concerned with the racemization of any of the stereoisomeric menthols.

Laevo-menthol is an important article of commerce. One of its most valuable properties is that it imparts a sensation of cooling when applied to skin or mucous membrane and so it finds wide use in cigarettes, lotions and various other cosmetics and pharmaceutical preparations. Dextro-menthol does not have this property, and racemic menthol, as an equal mixture of d- and l- forms, has the property only to about half the extent that the laevo-form has. As a result, d-menthol may not be used at all to substitute for l-menthol, and dl-menthol may be used only in some cases, since it is necessary to use twice as much to get the same cooling effect, and at this concentration, the intensity of odor or taste, or possibly irritation, may be objectionable. For applications where the cooling effect is of minor importance, of course, di-menthol is the equivalent of l-menthol.

The other stereomers of menthol, neomenthol, isomenthol and neoisomenthol, of whatever optical sign, do not display the desired cooling effect and so are useless as replacements for l-menthol, although those belonging to the l-menthol family may be converted by known means to l-menthol; see Simonsen, The Terpenes, vol. I, page 243.

It is desirable to be able to synthesize l-menthol, and this has been done in the art, starting from suitably optically active materials. Another synthesis known to the art is via the resolution of dl-menthol prepared from inactive materials. This synthesis is of the greatest versatility, since optically inactive raw materials are more generally and cheaply available. Unfortunately, the resolution of dl-menthol gives rise to a pound of worthless d-menthol for every pound of l-menthol at best, assuming 100% efficient resolution. Actual known resolution processes are less efficient, so that over a pound of more-or-less active d-menthol is produced per pound of pure l-menthol actually recovered. Since there has been no known method for racemizing menthol, the d-menthol represents a costly and useless by-product, and so the production of l-menthol by resolution of dl-menthol has not been economic.

It is therefore desirable to be able to racemize the d-menthol and convert it again to dl-menthol, so that it could be recycled to the resolution process, thereby recovering economic value from it. Accordingly, it is an object of the present invention to racemize d-menthol.

Another object is to convert active menthol to racemic menthol.

Another object is to convert any optically active stereoisomeric menthol to dl-menthol.

Another object is to convert an optically active menthol to a mixture of racemic menthols.

Other objects will be apparent to those skilled in the art.

The present invention provides a simple method of racemizing d-menthol or any other optically active stereoisomeric menthol to produce dl-menthol or any of the stereoisomeric optically inactive menthols. Thus, the unwanted isomer from the resolution of dl-menthol can be reconverted to dl-menthol, so that by recycling substantially all of the dl-menthol can be converted to l-menthol. This invention thereby makes the preparation of l-menthol from dl-menthol economic. The family relationships of the stereoisomeric menthols to each other and to the menthones are shown below:

D-MENTHOL FAMILY

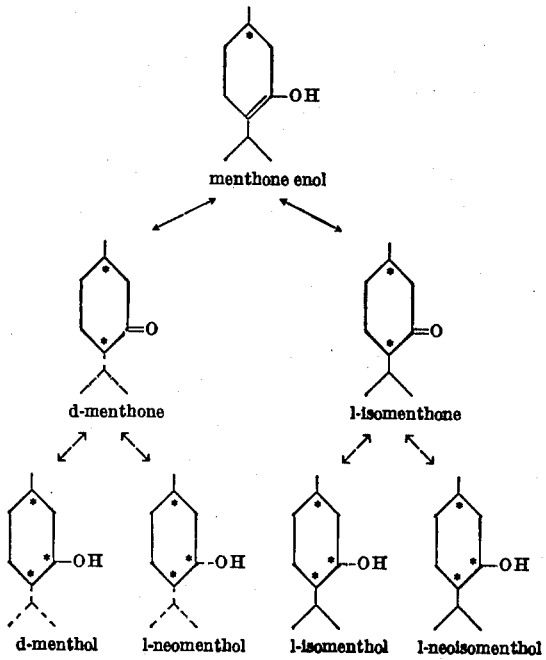

L-MENTHOL FAMILY

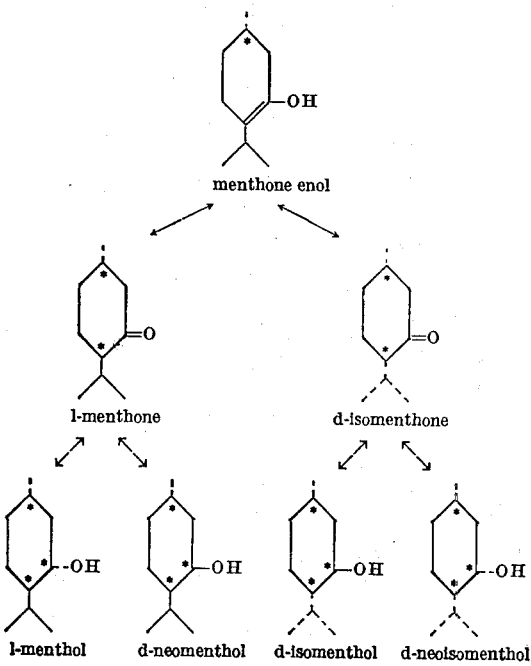

In the above diagrams, the ring is assumed to be planar and in the plane of the paper. Substituents shown in solid lines are above the plane of the paper, unless on an unsaturated carbon, in which case they are in the plane, and substituents shown dotted are below the plane of the paper. Asymmetric carbons are shown with an asterisk.

It can be seen that all of the members of each family are interconvertible within the family by way of the common enol of the ketone. All that is required is that there exist an oxidation-reduction system so that the alcohols are in equilibrium with their ketones, which are, of course, in equilibrium with their common enol. A practical and well-known way of accomplishing this condition is to use metal alkoxides such as sodium alkoxide or aluminum alkoxide. These alkoxides are used in such well-known reactions as the Meerwein-Ponndorf reduction and the Oppenauer oxidation, where an equilibrium between alcohol and ketone is set up. Another method is to treat with a hydrogenation catalyst. Secondary alcohols generally reach an equilibrium with the ketones over these catalysts, the position of the equilibrium being determined among other things by the temperature and partial pressure of hydrogen, since hydrogen is part of the equilibrium in this case.

It is evident from the above discussion that although the carbon atoms 3 and 4 may be inverted readily by known techniques, and indeed these processes form the bases for the known interchange of stereoisomers within a family, yet this interchange does not involve the optically active number 1 carbon atom which determines the family. In essence, the equilibration may be thought of as a transfer of hydrogen on or off of the oxygen attached to the number 3 carbon to produce the ketone in equilibrium as an intermediate in going from one stereomer to the other.

I have found that by heating the menthol with nickel, cobalt, copper chromite, or other hydrogenation catalyst, under certain conditions, it is possible to effect a displacement of hydrogen at the carbon atoms themselves, even including the isolated number 1 carbon. Since, as is taught in chemical theory, every displacement inverts, such a displacement at the number 1 carbon leads to a change in family.

It has been found that when the optically active menthol is heated with the hydrogenation catalyst at a temperature above about 250° C., racemization occurs. The top temperature is that at which substantial decomposition occurs. Thus, temperatures up to 400° C. can be employed, although these higher temperatures are not ordinarily recommended. In general, temperatures of about 260° to 280° C. are preferred, since at these temperatures the racemization is sufficiently rapid to be economically feasible and side reactions are near a minimum.

It will be appreciated that lower temperatures will require a longer time for racemization than higher temperatures, and so it is normally desirable to use the highest temperature that the menthol will stand in order that the reaction can be completed rapidly. Near the upper limit, side reactions become important, so that for very short reaction time an economic compromise may be necessary. I prefer to employ sufficient pressure to inhibit dissociation of the menthol to menthone and hydrogen, but the invention can be practiced to obtain more or less menthone if desired. Under optimum conditions, the menthol can be totally racemized in nearly quantitative yield. No hydrogen is consumed in the racemization, and the only consumption is to minor side reactions and mechanical loss. The catalyst can also be reused so that the process is very economical. Since the conditions for racemization of menthol are more severe than those required for epimerization at the 3- and 4-positions, it follows that such epimerization will occur as well as racemization. This being so, any stereoisomeric active menthol is suitable for racemization and the racemized menthol will be an equilibrium mixture of racemic stereomers regardless of the feed. The processing of such equilibration mixtures for the manufacture of dl-menthol is well known to the art and is not a subject of this invention.

The following examples are illustrative:

*Example 1*

100 g. l-menthol USP and 10 g. of a commercial copper chromite catalyst were charged to a 720 cc. bomb. After purging the bomb to remove air, hydrogen was fed in to a pressure of 1300 p. s. i. g. and the bomb was sealed off. It was then heated with rocking to 270° C. and held at 267–270° C. with rocking for 9 hours. Rocking was continued as the apparatus cooled. When cool, the catalyst was filtered off to recover the menthol which was now liquid. Optical rotation was 0°. In order to ascertain that the material was truly racemized and that the 0° rotation was not the coincidental sum of various epimers having d and l rotations, the product was fractionated at high reflux ratio to obtain cuts enriched in the various epimers. Each of these cuts had 0° rotation. Aside from a few grams of lights at the beginning, the product was entirely epimeric racemic menthols. For further proof, a cut from the distillation consisting of menthol and neomenthol, both of which are related to the ketone, trans-menthone, was oxidized according to the Beckmann chromic acid procedure and gave pure dl-trans-menthone, rotation 0°.

*Example 2*

100 g. of l-menthol USP and 1 g. of commercial copper chromite catalyst were charged to the same apparatus as in Example 1. The bomb was filled to a hydrogen pressure of 500 p. s. i. g. and sealed off. It was then heated with rocking to 268–275° C. and rocked there for 19 hours, then allowed to cool with rocking. After filtering off the catalyst, the product had a rotation of 0° and was a liquid mixture of stereoisomeric racemic menthols. As in Example 1, the product was then fractionated and the individual cuts showed a rotation of 0°.

*Example 3*

100 g. of synthetic d-menthol was treated as in Example 1. Identical results were obtained as obtained in Example 1.

*Example 4*

100 g. of d-neomenthol was treated as in Example 1. An epimeric mixture of racemic menthols was obtained.

*Example 5*

100 g. of d-isomenthol synthesized from optically active raw materials was treated as in Example 2. The results were the same as in the preceding examples.

In all of the preceding examples there was produced less than 5% of hydrocarbons due to side reactions, the balance being epimeric racemic menthols. A small amount of menthone was present, particularly in the lower pressure runs, but no other product could be detected. The mixture of epimers consisted of 60–65% dl-menthol with the balance made up of dl-neomenthol, dl-isomenthol, and dl-neoisomenthol, in order of decreasing amounts. All analyses were carried out by use of infrared spectrophotometry.

*Example 6*

200 g. of l-menthol, $[\alpha]_D$ —49°, and 20 grams of copper chromite catalyst were mixed at 270–275° C. for 4.5 hours under hydrogen pressure. The maximum working pressure was 500 p. s. i. g. The product was then filtered to remove catalyst and fractionated through an efficient column at 10 mm. pressure. Infrared spectroanalysis and optical rotations of the fractions indicated that the product was:

| | Percent |
|---|---|
| Hydrocarbons | 5 |
| dl-Menthone | 1–2 |
| dl-Neomenthol | 18–20 |
| dl-Menthol | 62–64 |
| dl-Neoisomenthol | 1–2 |
| dl-Isomenthol | 10–12 |

Example 7

200 grams of l-menthol, $[\alpha]_D$—49°, and 4 grams of the same copper chromite catalyst used in Example 6 were mixed at 270–275° C. for 11 hours under hydrogen pressure. The maximum working pressure was 500 p. s. i. g. The product was then filtered and fractionated as shown in Example 6. Infrared spectroanalysis and optical rotations of the fractions indicated that the product was:

| | Percent |
|---|---|
| Hydrocarbons | 5 |
| dl-Menthone | 1–2 |
| dl-Neomenthol | 20–22 |
| dl-Menthol | 60–62 |
| dl-Neoisomenthol | 1–2 |
| dl-Isomenthol | 10–12 |

Example 8

A mixture of 150 grams of l-menthol, $[\alpha]_D$—48.7°, and 4.5 grams of a commercial nickel hydrogenation catalyst was placed in a bomb. The bomb was purged with hydrogen, sealed at 200 p. s. i. g. and rocked for 12 hours at 270° C. The product had an $[\alpha]_D$—6.3°. The purest fraction was about 85% menthol with $[\alpha]_D$—13.5°. Assuming the impurity of this fraction to be racemized isomenthol, the racemization was 64%.

Example 9

200 grams of l-menthol, $[\alpha]_D$—48.7°, was placed in a bomb, the bomb purged with nitrogen and sealed at atmospheric pressure. The sealed bomb was then rocked 12 hours at 375° C. The total product had a rotation of $[\alpha]_D$—31.4°. Infrared analysis indicated the product to be 78% menthol. The product was fractionated and the best menthol fraction showed $[\alpha]_D$—48.2°. The compounds formed were mostly hydrocarbons and one or more carbonyl compounds possessing a menthone-like odor, but no menthone or isomenthone recognizable by infrared analysis was present.

Example 10

One hundred grams of l-menthol USP was charged into a bomb with seven grams of moist Raney cobalt and warmed to 125° C. to melt the menthol. The bomb was then purged with hydrogen and filled to a pressure of 1950 pounds p. s. i. g. It was then sealed and heated and rocked at 275° C. for 12 hours. The product possessed a rotation of 0.0°.

Example 11

Five grams of Raney nickel was suspended in 50 cc. of water and treated with 10 milligrams each of palladium and platinic chlorides. When most of the color had been discharged from the solution, one gram of sodium hydroxide was added and the mixture was heated to boiling. The catalyst was then washed thoroughly with water and was employed to treat 150 grams l-menthol at 270° C. under a hydrogen pressure of 1000 pounds per square inch gauge at that temperature. After the bomb had been rocked for 12 hours, it was cooled and the product was found to possess an optical rotation of —4.2°.

It is thus seen that by this use of hydrogenation catalysts and heating at the proper temperature, racemization of any optically-active menthol isomer can be accomplished with the formation of a mixture of racemic menthols in which dl-menthol predominates.

The dl-menthol is readily separated from the other racemates present by known means, such as by fractional distillation, fractional crystallization or through similar separations of derivatives. The remaining fractions or mixtures of the optically-inactive iso-, neo- and neoisomenthols can then either be equilibrated to form more dl-menthol, or in the alternative added to feed material for the racemization.

The recovered dl-menthol can be resolved by any known means, such as by esterification with d-menthoxyacetic acid and separation of the esters. Hydrolysis of the individual esters will yield l-menthol and d-menthol, and the latter can then be subjected to the racemization procedure.

Thus, by the employment of the present invention, it is possible to substantially completely convert any inactive isomer into any active isomer or to substantially completely convert any active menthol or menthol isomer into its corresponding enantiomorphic form or into any member of the opposite family of menthols. However, since l-menthol is the most valuable member of the isomeric menthols, its formation from d-menthol will be the most useful application of the present invention.

It will be appreciated that heating at the temperatures contemplated in the presence of the selected catalyst will bring about some increase in the total amount of racemized materials in the mixture. Of course, at lower temperatures and short times, the total increase in the content of racemized materials will be small, but treatment short of complete racemization is contemplated. Ordinarily, however, it will be preferred to continue the treatment until there has been a substantial increase in the total quantity of racemized material.

It will also be understood that optically-active, but partly racemized, material can be subjected to the racemization treatment, as well as optically-pure materials, since if racemization is complete, the racemized mixture will be composed of substantially the same proportion of the four dl-forms of menthol, isomenthol, neomenthol and neoisomenthol.

In the claims, the term "racemization" is intended in the broad sense to include formation of dl-forms of the isomeric menthols whether complete or incomplete. Thus, complete racemization of an optically pure l-neoisomenthol isomer would result in only 1–2% dl-neoisomenthol, along with its racemic isomers, dl-menthol, dl-isomenthol and dl-neomenthol. Also the treatment of d-neoisomenthol, $[\alpha]_D=+0.14$ to produce a mixture substantially identical with that of Example 8, in which the racemization mixture had $[\alpha]_D=-6.3$, is the treatment of an optically-active menthol to bring about racemization.

The term "menthol," when not used with the designations l, d and dl, is used in a broad sense to refer to any or all of the isomeric forms, but when used with such designations, specific isomers are intended.

The term "optically active menthol" refers to the optical activity of the menthol itself and not to the ability of any mixture being treated to rotate the plane of polarized light. Thus, the treatment of a mixture of optically pure d-menthol and the optically pure forms l-neomenthol, l-isomenthol and l-neoisomenthol in proportions to produce a zero rotation of polarized light would be a treatment of an optically active menthol.

Having described the invention, what is claimed is:

1. The process for producing l-menthol from d-menthol which comprises heating d-menthol under a hydrogen pressure in the presence of a hydrogenation catalyst selected from the class consisting of copper chromite, cobalt and nickel at a temperature in the range of about 260° C. to 280° C. for a time sufficient to bring about a substantial racemization of the d-menthol, recovering dl-menthol, from racemization mixture, resolving the recovered dl-menthol to recover l-menthol and a d-menthol fraction, and subjecting the d-menthol obtained from the resolution procedure to the aforesaid racemization procedure.

2. The process of claim 1 in which the mixture of menthols remaining from the recovery of the dl-menthol step is returned to the process along with the d-menthol for treatment in the racemization step.

3. The process of claim 1 in which the mixture of menthols remaining after the recovery of the dl-menthol is subjected to an equilibration treatment and dl-menthol thus produced is recovered from the equilibration mixture and returned to the process for resolution.

4. The process which comprises heating an optically active member of the menthol group of compounds at a temperature above 250° C. but below the decomposition point of menthols under a hydrogen pressure in the presence of a hydrogenation catalyst for a time sufficient to bring about substantial racemization, recovering dl-menthol from the racemization mixture, subjecting the dl-menthol to a resolution procedure to recover an optically active form of menthol of a different family than the starting material and an optically active form of menthol of the same family as the starting material and subjecting said latter form of menthol to racemization.

References Cited in the file of this patent

UNITED STATES PATENTS

| | | |
|---|---|---|
| 1,776,087 | Schollkopf et al. | Sept. 16, 1930 |
| 1,776,667 | Schollkopf et al. | Sept. 23, 1930 |
| 1,811,711 | Blagden | June 23, 1931 |
| 1,811,777 | Blagden | June 23, 1931 |
| 2,237,980 | Blagden et al. | Apr. 8, 1941 |

OTHER REFERENCES

Komatsu: Chem. Abstracts, vol. 19, 2901, 1925.

West et al.: Synthetic Perfumes, Arnold & Co., London, 1949, pp. 32–43.